US008352363B2

(12) United States Patent
Hou

(10) Patent No.: US 8,352,363 B2
(45) Date of Patent: Jan. 8, 2013

(54) MAINFRAME-BASED FAR-DISTANCE BICENTRIC TRANSACTION INFORMATION PROCESSING METHOD AND SYSTEM

(75) Inventor: Weidong Hou, Shanghai (CN)

(73) Assignee: Bank of Communications, Shanghai (CN)

( * ) Notice: Subject to any disclaimer, the term of this patent is extended or adjusted under 35 U.S.C. 154(b) by 382 days.

(21) Appl. No.: 12/766,759

(22) Filed: Apr. 23, 2010

(65) Prior Publication Data

US 2011/0137790 A1    Jun. 9, 2011

(30) Foreign Application Priority Data

Dec. 8, 2009    (CN) .......................... 2009 1 0200086

(51) Int. Cl.
*G06Q 40/00*    (2012.01)
(52) U.S. Cl. ........... 705/39; 711/162; 714/4.12; 714/15; 714/19; 714/E11.047; 714/E11.119
(58) Field of Classification Search .................... 705/39; 711/162; 714/4.12, 15, 19, E11.047, E11.119
See application file for complete search history.

(56) References Cited

U.S. PATENT DOCUMENTS

| 5,796,934 | A | * | 8/1998 | Bhanot et al. ................ 714/4.12 |
| 5,854,754 | A | * | 12/1998 | Cabrera et al. ................... 703/2 |
| 7,467,267 | B1 | * | 12/2008 | Mayock ........................ 711/162 |
| 2003/0149556 | A1 | * | 8/2003 | Riess ............................. 703/21 |
| 2005/0055521 | A1 | * | 3/2005 | Saika ............................ 711/162 |
| 2005/0210080 | A1 | * | 9/2005 | Saika ............................ 707/204 |
| 2009/0210462 | A1 | * | 8/2009 | Arakawa et al. .............. 707/204 |
| 2010/0325268 | A1 | * | 12/2010 | Muthiah et al. ............... 709/224 |

* cited by examiner

*Primary Examiner* — Jagdish Patel
*Assistant Examiner* — Kevin Poe
(74) *Attorney, Agent, or Firm* — Norman R. Van Treeck; Jeffrey G. Sheldon; Sheldon Mak & Anderson

(57) ABSTRACT

A mainframe-based far-distance bicentric transaction information processing system, providing a processing operation solution. The method includes: receiving upload transaction information containing transaction type data; searching transaction information requiring an amount of shared resource less than a preset threshold when being processed, according to the transaction type data; and transmitting the transaction information requiring the amount of shared resource less than the preset threshold when being processed, to a backup processing center to be processed, when CPU utilization rates exceeds a preset safety threshold. The system includes a main processing center and a backup processing center. The transaction information processing method and system implement the mainframe parallel sysplex far-distance bicentric transaction processing including the main processing center and the backup processing center, which expands the physical distance between the two centers, improves the processing capability and reliability of the transaction system, and sufficiently utilizes the resources of the backup processing center.

12 Claims, 5 Drawing Sheets

MAINFRAME-BASED FAR-DISTANCE BICENTRIC TRANSACTION INFORMATION PROCESSING METHOD AND SYSTEM

CROSS-REFERENCE TO RELATED APPLICATIONS

The present Application claims the benefit of Chinese Patent Application 200910200086.1, titled "Mainframe-Based Far-Distance Bicentric Transaction Information Processing Method and System," filed Dec. 8, 2009; the contents of which are incorporated in this disclosure by reference in their entirety.

FIELD OF THE INVENTION

The present invention relates to a transaction information processing method and system, particularly, to a mainframe-based far-distance bicentric transaction information processing method and system.

DESCRIPTION OF THE RELATED ART

The backup for disaster recovery of business systems is very important for financial industries such as banking, security and insurance. For example, many large banks establish bicentric operative environment in a same city, wherein two centers operate simultaneously and back up each other, and can take over the transaction processing of the counterpart in real-time once disaster occurs.

Although data interaction between the centers is performed using the optic cable communication mode which is the rapidest and speediest so far, a physical distance between the two centers in the same city is still limited by optic cable transmission delay, thus being no more than 20 kilometers, because the transaction response time will be increased rapidly when the distance exceeds 20 kilometers.

When the physical distance between the two centers exceeds 20 kilometers, the cross-place transaction processing will slow down because the parallel transaction processing of the mainframe sysplex is influenced by the distance, and the local transaction performance deteriorates due to reasons such as sharing lock resource, thus the entire transaction performance degrades seriously.

SUMMARY OF THE INVENTION

The object of the present invention is to provide a mainframe-based far-distance bicentric transaction information processing method and system capable of performing far-distance transaction process by using dual processing centers and ensuring the processing quality of transaction information.

In order to achieve the object, the present invention provides a mainframe-based far-distance bicentric processing method for transaction information, including:
  receiving upload transaction information containing transaction type data;
  searching transaction information requiring an amount of shared resource less than a preset threshold when being processed, according to the transaction type data;
  transmitting the transaction information requiring the amount of shared resource less than the preset threshold when being processed, to a backup processing center to be processed, when a CPU utilization rate exceeds a preset safety threshold.

In order to achieve the object, the present invention provides a mainframe-based far-distance bicentric processing system for transaction information, including:
  a receiving unit for receiving upload transaction information containing transaction type data;
  a searching unit for searching transaction information requiring an amount of shared resource less than a preset threshold when being processed, according to the transaction type data;
  a transmitting unit for transmitting the transaction information requiring the amount of shared resource less than the preset threshold when being processed to a backup processing center to be processed, when a CPU utilization rate exceeds a preset safety threshold.

In order to achieve the object, the present invention provides a mainframe-based far-distance bicentric processing system for transaction information, including a main processing center and a backup processing center;
  the main processing center comprises:
    a TCP/IP SD port and a main Terminal Owing Region (TOR) for forwarding received transaction information based on a preset routing rule, according to transaction type data in the received upload transaction information; and
    a main Application Owing Region (AOR) for processing the upload transaction information forwarded by the TCP/IP SD port and the main TOR;
  the backup processing center comprises:
    a backup AOR for receiving and processing transaction information transmitted by the TCP/IP SD port or the main TOR which requires an amount of shared resource less than a preset threshold when being processed, when a CPU utilization rate of the main processing center exceeds a preset safety threshold.

The transaction information processing method and system of the invention realize the mainframe parallel sysplex far-distance bicentric transaction information processing of the main processing center and the backup processing center, breaking through the current limit of 20 kilometers and reaching 70 kilometers, which improves the processing capability and reliability for transaction information, and sufficiently utilizes the resources of the backup processing center.

BRIEF DESCRIPTION OF THE DRAWINGS

In order to describe the technical solutions of the embodiments of the present invention or the prior art more clearly, the drawings required in the descriptions of the embodiments will be briefly introduced as follows. The following discussion describes in detail one embodiment of the invention and several variations of that embodiment. This discussion should not be construed, however, as limiting the invention to those particular embodiments. Practitioners skilled in the art will recognize numerous other embodiments as well.

DETAILED DESCRIPTION OF THE PREFERRED EMBODIMENTS

The technical solutions of the embodiments of the present invention will be described clearly and completely as follows in reference to the drawings of the embodiments of the present invention. Apparently, the described embodiments are just a part of the embodiments of the present invention, instead of all the embodiments. Any other embodiment obtained by a person skilled in the art based on the embodiments of the present invention without paying any creative effort shall fall within the protection scope of the present invention.

The present invention routes transaction information related to inquiry transaction (read only) and the lightweight update transaction in a production center of the main center to the backup center to be processed, using far-distance bicentric operation of the mainframe parallel sysplex, so that the processing systems of the same transaction information operate simultaneously at the main center and the backup center in the same city, and the permitted physical distance is more than 70 kilometers, which breaks through the limit of 20 kilometers of the distance between the two centers of the mainframe parallel sysplex processing system for the transaction information.

Figure 1:
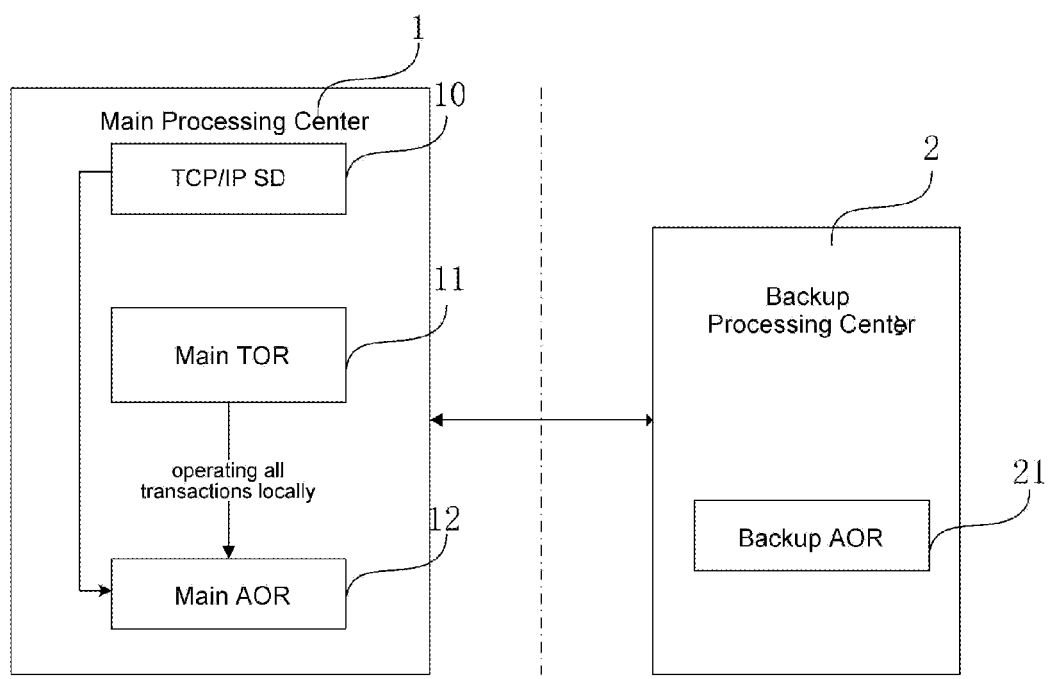
FIG. 1 is a first schematic diagram of transaction information processing system according to the present invention.

FIG. 1 is a first schematic diagram of a mainframe-based far-distance bicentric transaction information processing system of the present invention. As illustrated in FIG. 1, the system includes a main processing center 1 and a backup processing center 2. The distance between the main processing center 1 and the backup processing center 2 can reach 70 kilometers.

The main processing center 1 includes a Transmission Control Protocol/Internet Protocol (TCP/IP) Sysplex Distributor (SD) port 10, a main Terminal Owing Region (TOR) 11 and a main Application Owing Region (AOR) 12. The backup processing center 2 includes a backup AOR 21.

The main processing center and the backup processing center of the transaction information processing system of the present invention can be implemented with the mainframe. On the platform of the mainframe, the Customer Information Control System (CICS) can be used as the middleware for transaction processing, and the IBM DATA BASE 2 (DB2) can be used as the data management platform. The service processing system based on mainframe parallel sysplex usually has the architecture of CICSPlex+DB2 data sharing.

A CICS address space is usually called as a region, which can be divided into TOR and AOR based on their different roles in processing transaction information. Furthermore, there are some regions for performing special functions. Multiple CICS regions can constitute a CICSPlex environment under the management of the CICSPlex System Manager (CPSM).

The TOR (e.g., main TOR 11) has a function of connecting peripheral systems, accessing transaction information, and forwarding the transaction information to the AOR (e.g., the main AOR 12 and the backup AOR 21) for being processed. The AOR is responsible for detailed processing of transaction information.

Figure 2:
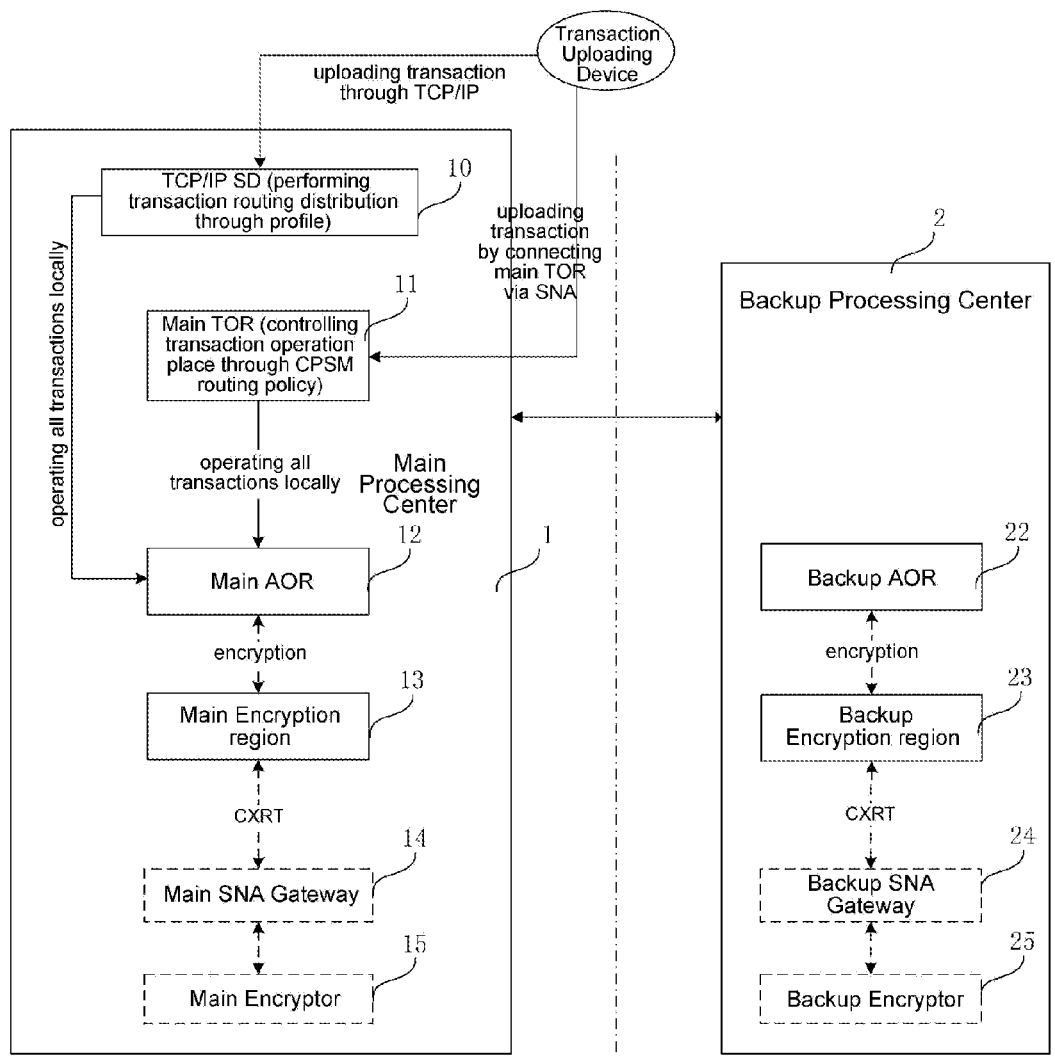
FIG. 2 is a second schematic diagram of transaction information processing system according to the present invention.

FIG. 2 is a second schematic diagram of a mainframe-based far-distance bicentric transaction information processing system of the present invention. As illustrated in FIG. 2, the system includes a main processing center 1 and a backup processing center 2. Similarly, the distance between the main processing center 1 and the backup processing center 2 can reach 70 kilometers. The main processing center 1 includes a TCP/IP SD port 10, a main TOR 11, a main AOR 12 and a main encryption region 13, and further includes a main System Network Architecture (SNA) gateway 14 and a main encryptor 15. The backup processing center 2 includes a backup AOR 22 and a backup encryption region 23, and further includes a backup SNA gateway 24 and a backup encryptor 25.

The transaction information processing system of the present invention can deal with a number of data encryption operations (e.g., transaction information processing applied to banks). This function can be separated to a specific region, which is called an encryption region (e.g., the main encryption region 13 and backup encryption region 23).

Still as illustrated in FIG. 1, there may be two methods for accessing transaction, i.e., uploading transaction information. One common method is accessing by SNA connection, in which a SNA connection is established between a peripheral gateway and the main TOR of the main processing center, and the transaction information is uploaded through the connection. The other method is via TCP/IP, in which the transaction information is uploaded to the TCP/IP SD port, and the SD port is responsible for distributing the transaction information to specific region for being processed.

The CICSPlex System Manager Workload definitions (CPSM WLMdef) defines a detailed execution path for a specific transaction. In reference to the definition, the main TOR forwards the specific transaction to a specific main AOR for being processed, thereby realizing the route control of the transaction.

Figure 3:
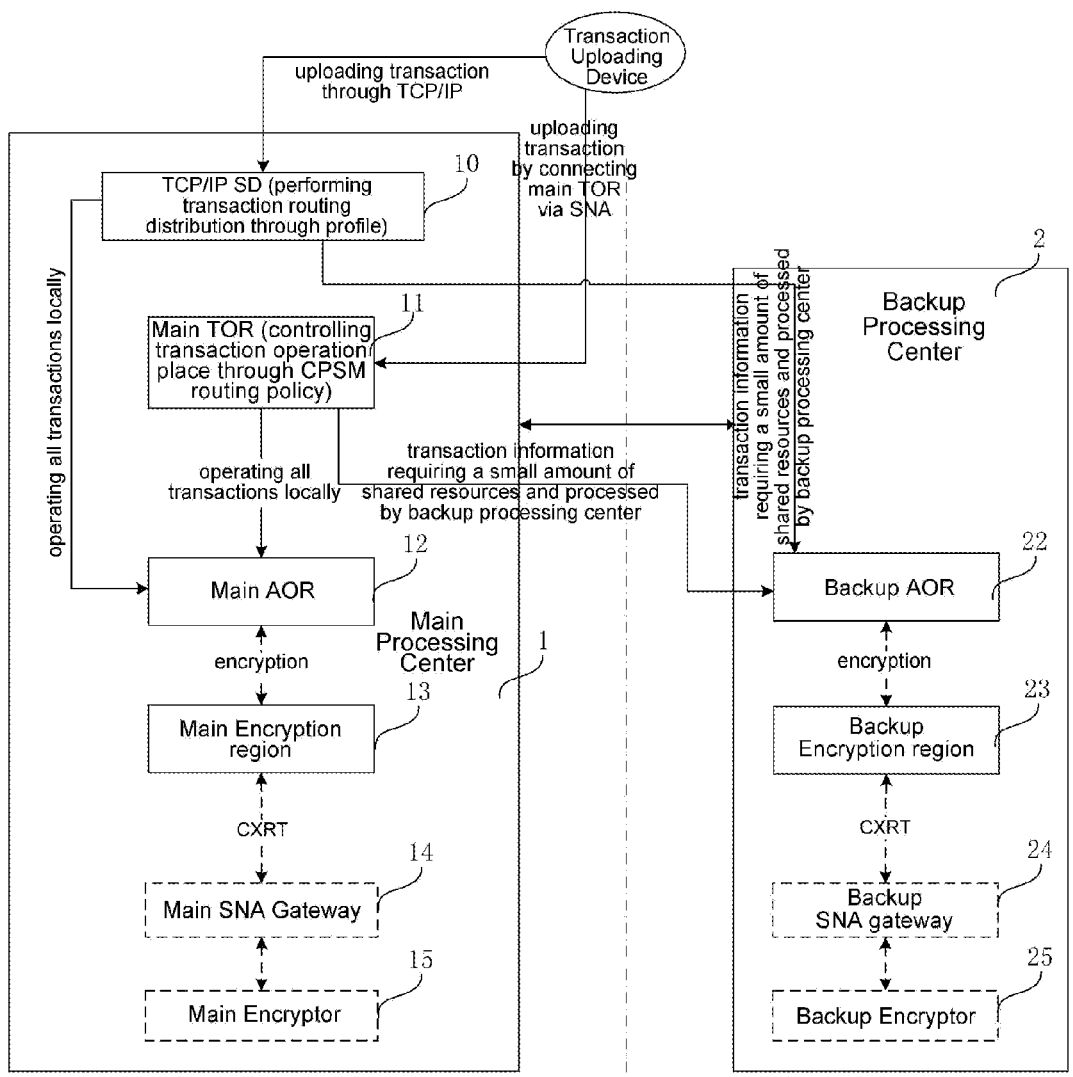
FIG. 3 is a second schematic diagram of transaction information processing system according to the present invention.

FIG. 3 is a third schematic diagram of a mainframe-based far-distance bicentric transaction information processing system of the present invention. As illustrated in FIG. 3, the system includes a main processing center 1 and a backup processing center 2. Similarly, the distance between the main processing center 1 and the backup processing center 2 can exceed 70 kilometers. The main processing center 1 includes a TCP/IP SD port 10, a main TOR 11, a main AOR 12 and a main encryption region 13, and further includes a main SNA gateway 14 and a main encryptor 15. The backup processing center 2 includes a backup AOR 22 and a backup encryption region 23, and further includes a backup SNA gateway 24 and a backup encryptor 25.

The TCP/IP SD port or the main TOR 11 forwards the received transaction information based on a preset routing rule according to the transaction type data included in the received upload transaction information. The main AOR 12 processes the upload transaction information forwarded by the TCP/IP SD port 10 and the main TOR 11. When a utilization rate of the CPU of the main processing center 1 exceeds a preset safety threshold, the backup AOR 22 receives and processes transaction information forwarded by the TCP/IP SD port 10 or the main TOR 11 which requires an amount of shared resource less than a preset threshold when being processed.

As illustrated in the figure, when the resources in the main processing center are in shortage and the transaction load is too large, i.e., the utilization rate of the CPU of the main processing center exceeds the preset threshold, the transaction information, which requires an amount of shared resource less than a preset threshold when being processed, will be transmitted to the backup processing center to be processed. The shared resource may be an application database lock, etc.

In the detailed processing, in order to reduce the influence by the transaction route switching on production (i.e., transaction information processing), and solve the problem about resources competition in the cross-place transaction between the main processing center and the backup processing center, the transaction information shall be classified to find out transaction information requiring a small amount of shared resource when being processed, e.g., inquiry transaction (read only) and some lightweight update transaction, as candidate transaction information for routing to the backup processing center. Transaction coding is performed, for example is normalized, to group the transaction and perform a group routing control.

With respect to the candidate transaction routing to a remote center, an automatic routing switching script shall be compiled, so as to hierarchically and flexibly control whether the transaction information should be processed at the main processing center locally or the backup processing center upon actual demand. The candidate transaction information shall be routed in batches and in series to the backup processing center to be processed, so as to prevent instant impact on the performance of the whole transaction information processing system due to excess transaction information being forwarded to the backup processing center at the same time, and realize smooth switching.

When the transaction information processing system of the present invention is accessed by a service transaction information, the transaction routing switching can be carried out by using the CPSM WLMDEF transaction routing rule or in TCP/IP SD distribution manner, according to the transaction access mode. With respect to the transaction information accessing the TOR through the SNA, the routing control is carried out by activating the CPSM WLMDEF. With respect to the transaction information accessing via the TCP/IP, the routing switching of transaction information is realized by dynamically activating TCP/IP SD policy according to classification of a service port.

The transaction information processing system of the present invention has double processing centers, and a bicentric environment breaking through the limit of 20 kilometers is established, thus the bicentric transaction information parallel processing operation with a distance up to 70 kilometers can be realized, which improves the processing capability and reliability of the whole processing system, sufficiently utilizes the resources of the backup processing center, and reduces the cost and improves the efficiency. A new processing subarea is established in the backup processing center 70 kilometers away from the main processing center, so as to constitute a cross-center mainframe parallel transaction information processing sysplex, together with the system of the production center of the main processing center. The transaction information is classified to identify the transaction information requiring the small-amount of the shared resources such as the inquiry transaction and some lightweight update transaction, and scripts for automatically performing transaction information routing are compiled. In accordance with the preset transaction routing rule, the selected production-transaction information is hierarchically and smoothly routed to the backup processing center to be processed, so as to seamlessly realize the far-distance mainframe bicentric processing operation without influencing the entire transaction performance.

Figure 4:
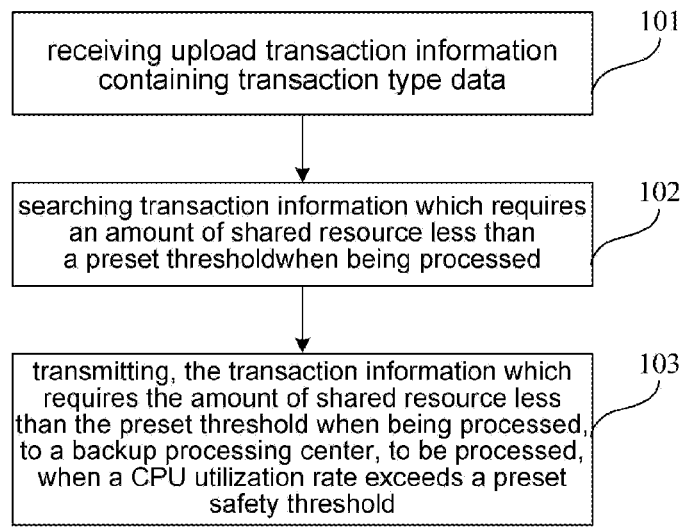
FIG. 4 is a flowchart of Embodiment 1 of the transaction information processing method according to the present invention.

FIG. 4 is a flowchart of Embodiment 1 of the mainframe-based far-distance bicentric transaction information processing method of the present invention. As illustrated in FIG. 4, the method including the following steps:

Step 101: receiving upload transaction information containing transaction type data.

Step 102: searching transaction information requiring an amount of shared resource less than a preset threshold when being processed, according to the transaction type data.

With respect to the problem related to transaction performance degradation due to the far distance between the main and the backup processing centers, the production transaction information is classified to select the transaction information requiring an amount of shared resource less than a preset threshold when being processed, for example, the shared resource can be an application database lock, etc. The transaction information requiring an amount of shared resource less than a preset threshold when being processed can be inquiry transaction (read only) and some lightweight update transaction, characterized by lock requirement on resources is low, and the influence on the processing of other transaction information is minimized.

Step 103: transmitting, the transaction information requiring the amount of shared resource less than the preset threshold when being processed, to a backup processing center to be processed, when a CPU utilization rate exceeds a preset safety threshold.

When transaction load is normal, i.e., the CPU utilization rate of the main center is below the preset safety threshold, all transaction information will be assigned to the main processing center so as to be processed. When the transaction load is too large in the main processing center, i.e., the CPU utilization rate of the main center exceeds the preset safety threshold, the transaction information requiring the amount of shared resource less than the preset threshold when being processed, e.g., the information of inquiry transaction (read only) and some lightweight update transaction, will be hierarchically and smoothly routed to the backup processing center to be processed. The transaction information processing response time of the backup processing center shall be controlled within an acceptable range. Meanwhile, the influence on other local transactions in the main processing center shall be minimized. In this manner, the object of sufficiently utilizing the resources of the backup processing center is achieved, so that the far-distance bicentric processing operation can be implemented.

Figure 5:
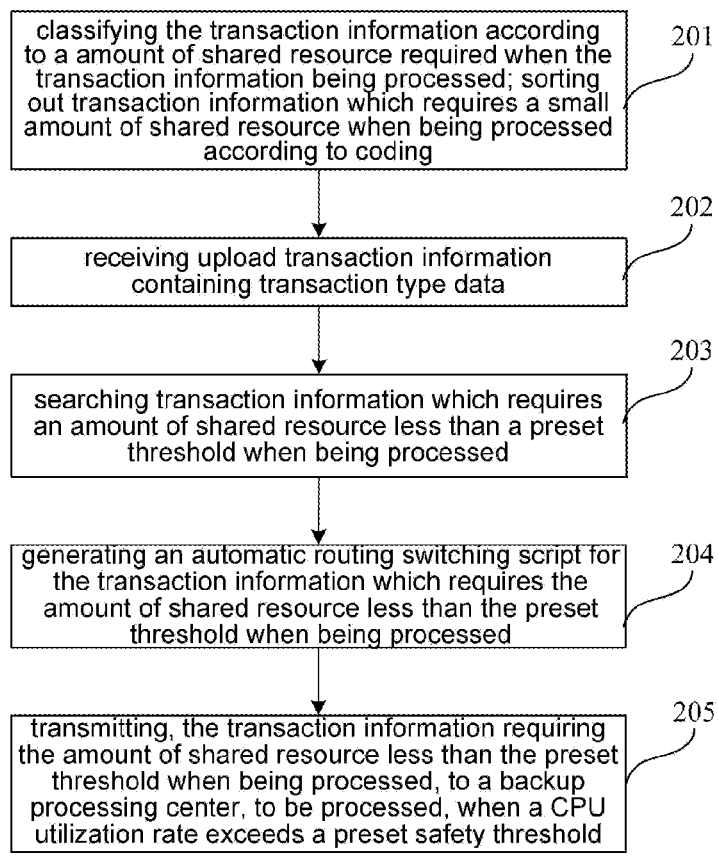
FIG. 5 is a flowchart of Embodiment 2 of the transaction information processing method according to the present invention.

FIG. 5 is a flowchart of Embodiment 2 of the mainframe-based far-distance bicentric transaction information processing method of the present invention. As illustrated in FIG. 5, the Embodiment 2 of the transaction information processing method of the present invention including following steps:

Step 201: coding the transaction information; classifying the transaction information according to an amount of shared resource required when the transaction information being processed; sorting out transaction information requiring a small amount of shared resource when being processed, according to the coding.

The transactions to be processed are classified according to the specific action characteristics thereof, that is, the transaction information requiring a small amount of shared resource, such as an application database lock, shall be identified, for example, including read-only transaction and lightweight update transaction; the transaction information is coded for the convenience of transaction grouping and group routing control.

Step 202: receiving upload transaction information containing transaction type data.

There are two methods for uploading transaction information. In one method, a SNA connection with the main processing center is established by the peripheral gateway, and the transaction information is uploaded to the main processing center through the SNA connection. The other method is via TCP/IP, wherein the peripheral gateway uploads the transaction information to main processing center through the TCP/IP SD port, and the SD port is responsible for distributing the transaction information to a specific region for being processed.

Step 203: searching transaction information requiring an amount of shared resource less than a preset threshold when being processed, according to the transaction type data.

In order to reduce the influence by the transaction routing switching on production (i.e., transaction information processing), and solve the problem relating to resource competition in the cross-place transaction between the main processing center and the backup processing center, the transaction information shall be classified, to find out transaction information requiring the amount of shared resource less than a preset threshold when being processed when being processed, e.g., inquiry transaction (read only) and some lightweight update transaction, as the candidate transaction information for routing to the backup processing center.

Step 204: generating an automatic routing switching script for the transaction information requiring the amount of shared resource less than the preset threshold when being processed.

An automatic routing switching script shall be compiled for the candidate transaction for routing to the far-distance center, to hierarchically and flexibly control whether the transaction information should be processed at the main processing center locally or the backup processing center upon demand.

Step 205: transmitting, the transaction information requiring the amount of shared resource less than the preset threshold when being processed, to a backup processing center, to be processed, when a CPU utilization rate exceeds a preset safety threshold.

The safety threshold of CPU utilization rate can be preset, so as to determine the condition under which the backup processing center shall be used to process the transaction information. When the transaction load is normal, i.e., the CPU utilization rate of the main processing center is below the preset safety threshold, all transaction information will be assigned to the main processing center so as to be processed. When the transaction load in the main processing center is too large, i.e., the CPU utilization rate of the main processing center exceeds the preset safety threshold, the identified read-only transaction information and lightweight update transaction information will be transmitted to the backup processing center to be processed, so as to dynamically switch the transaction processing between the main processing center and the backup processing center, according to the CPU utilization rate of the main processing center.

The transaction information requiring a large amount of shared resources when being processed shall be still processed at the main processing center. The candidate transaction information requiring a small amount of shared resources when being processed shall be routed in batches and in series to the backup processing center to be processed, so as to prevent the instant impact on the performance of the whole transaction information processing system due to excess transaction information being forwarded to the backup processing center at the same time, and realize smooth switching.

There are two transmitting methods. In one method, the transaction routing control is based on the CPSM WLMDEF transaction routing rules, routing the transaction information to the backup processing center to be processed; the other is to route the transaction information to the backup processing center to be processed by dynamically activating TCP/IP SD policy according to classification of a service port.

That is, when the transaction information processing system of the present invention is accessed by a service transaction information, the transaction routing switching can be carried out by using the CPSM WLMDEF transaction routing rules or in TCP/IP SD distribution manner, according to the transaction access mode. With respect to the transaction information accessing the TOR through the SNA, the routing control is carried out by activating the CPSM WLMDEF. With respect to the transaction information accessing via the TCP/IP, route switching of the transaction information is carried out by dynamically activating TCP/IP SD policy according to classification of a service port.

The transaction information processing method of the present invention implements the architecture of mainframe parallel sysplex bicentric processing operation. The transaction information in the transaction information processing system is normally coded, to find out the transaction information requiring a amount of shared resource less than a preset threshold when being processed, e.g., inquiry transaction and some lightweight update transaction, as candidate transactions for routing to the backup processing center to undergo transaction information processing, so that the transaction performance of the transaction information after being switched to the backup processing center will not degrade steeply. The compiling of the automatic routing switching script for the transaction information realizes hierarchical and flexible control of the transaction information routing switching from the main processing center to the backup processing center.

With respect to the problem related to transaction performance degradation due to the far distance between the main and backup processing centers, the transaction information processing method of the present invention classifies the production transaction information to select the transaction information requiring a small amount of shared resource when being processed, i.e., the inquiry (read only) transaction information and some lightweight update transaction information, because these transactions have less requirement on lock resource, and the influence on the processing of other transaction information is minimum. Such transaction information will be hierarchically and smoothly routed to the backup processing center from the main processing center, to be processed. The transaction response time of the far-distance processing center is controlled within an acceptable range. Meanwhile, the influence on other local transactions by the main processing center is minimized. In this manner, the object of sufficiently utilizing the resources of the far-distance backup processing center is achieved, and the far-distance bicentric processing operation can be implemented.

Figure 6:
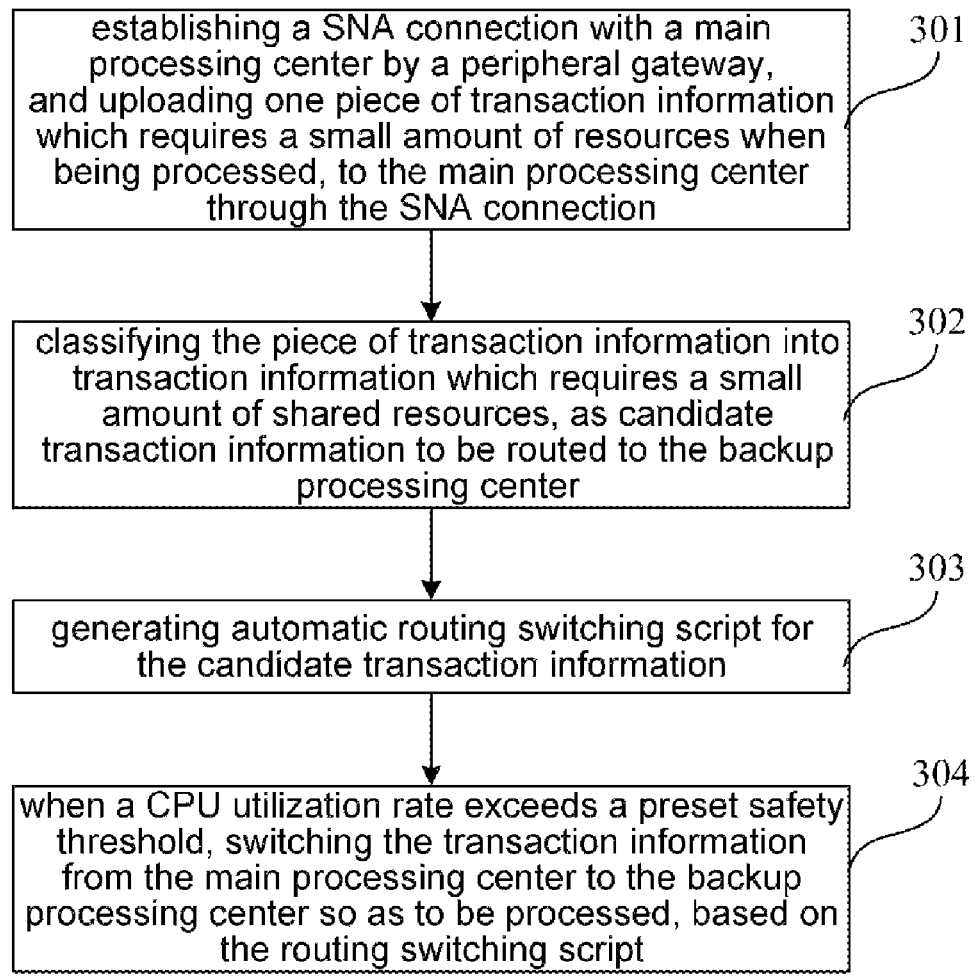
FIG. 6 is a flowchart of a transaction information processing method according to the present invention.

FIG. 6 is a flowchart of a mainframe-based far-distance bicentric transaction information processing method according to the present invention. Take the process on transaction information as an example, the method includes the following steps:

Step 301: establishing a SNA connection with a main processing center by a peripheral gateway, and uploading a piece of transaction information requiring a small amount of resources when being processed, such as inquiry transaction information and update transaction information, to the main processing center through the SNA connection.

Of course, it is possible to upload via TCP/IP.

Step 302: since the transaction information requires an amount of shared resources less than a preset threshold when being processed, it is classified as the transaction information requiring a small amount of shared resources, as candidate transaction information to be routed to the backup processing center.

Step 303: generating an automatic routing switching script for the candidate transaction information. By doing so, it is possible to switch the transaction information smoothly in batches based on the routing switching script.

Step 304: when a CPU utilization rate exceeds a preset safety threshold, switching the transaction information together with other transaction information requiring a small amount of shared resources when being processed, hierarchically and smoothly, from the main processing center to the backup processing center so as to be processed, based on the routing switching script.

When the transaction load is large at the main processing center, according to the amount of shared resources required when being processed, the transaction information requiring an amount of shared resource less than the preset threshold when being processed will be routed to the backup processing center so as to be processed, while other transaction information will still be processed by the main processing center.

In the invention, the CPSM WLMdef defines the specific execution path for a specific transaction. In reference to the definition, the main TOR forwards the specific transaction to a specific main AOR for being processed, thereby realizes the route control for the transaction.

Again referring to FIGS. 2 and 3, for example, the following WLMDEF defines a piece of transaction distribution routing rule wlmdef1, which specifies that transactions belonging to trangroup1 shall be distributed to cics region in cicsgrp1 for being executed.

```
CREATE WLMDEF NAME('wlmdef1')
TRANGRP('trangroup1') ------ name of transaction group that requires
distribution control, and being composed of transactions that require
specific distribution control
LUNAME('*')
    USERID('*')
    AORSCOPE('cicsgrp1') ------- transaction execution region group,
    being composed of several AORs
    DESC('WLMD FOR TRANROUP1')
    PROCESSTYPE('*')
    ;
```

SD profile: it defines address plus port of a specific service, and maps the service to a specific LPAR IP, and a main AOR on a target LPAR completes the service request by transaction processing. Based on these profiles, the TCP/IP SD transmits service requests for different transactions to specific AORs for being processed, so as to realize the route control of the transaction.

For example:

```
VIPADYNAMIC
    VIPADISTRIBUTE DEFINE DISTMETHOD SERVERWLM
aaa.aaa.aaa.aaa PORT xxxx
        defining virtual address + port of a specific transaction
    service DESTIP bbb.bbb.bbb.bbb ccc.ccc.ccc.ccc
        --- mapping the service to a specific IP address to achieve a
function of distributing to a specific lpar
    ENDVIPADYNAMIC
```

After being uploaded to the production environment of the main processing center, all the transaction information is operated locally at the main processing center in accordance with a preset policy.

When the resources of the production center of the main processing center are shortage, the policy of forwarding read-only or lightweight update transaction requiring small amount of resources to the backup processing center can be activated hierarchically and dynamically, while other update transactions shall be still operated locally at the main processing center.

The transaction information processing method of the present invention implements the mainframe parallel sysplex far-distance bicentric transaction processing, and the limit of 20 kilometers in the related art is broke through to reach 70 kilometers, which improves the processing capability and reliability of the production system of the transaction processing system, sufficiently utilizes the resources of the backup processing center, and reduces the cost and improves the efficiency in a large extent for the mainframe resources. In addition, a flexible and smooth transaction routing control can be realized.

In particular, the embodiment of the mainframe-based far-distance bicentric transaction information processing system of the present invention includes: a receiving unit for receiving upload transaction information containing transaction type data; a searching unit for searching transaction information requiring an amount of shared resource less than a preset threshold when being processed, according to the transaction type data; and a transmitting unit for transmitting the transaction information requiring the amount of shared resource less than the preset threshold when being processed to a backup processing center to be processed, when a CPU utilization rate exceeds a preset safety threshold.

The transaction information processing system of the present invention implements the mainframe parallel sysplex far-distance bicentric transaction processing of the main processing center and the backup processing center, and the limit of 20 kilometers in the related art is broke through to reach 70 kilometers, which improves the processing capability and reliability for the transaction information, and sufficiently utilizes the resources of the backup processing center.

A person skilled in the art may further appreciate that the present invention can be implemented with electronic hardware, computer software, or a combination thereof, in reference to the units and the algorithm procedures described in the embodiments disclosed herein. In order to clearly describe the interchangeability between hardware and software, the components and steps of respective examples have been generally described based on functions as above. Whether these functions are executed in the way of hardware or software shall be determined by the specific application of the technical solution and the design constraint condition. For each specific application, a person skilled in the art may implement the described functions using different methods, but the implementation shall not be deemed as going beyond the scope of the present invention.

The present invention can be implemented with hardware, processor executable software module, or a combination thereof, in reference to the units and the algorithm procedures described in the embodiments disclosed herein. The software module can be embedded in RAM, internal memory, ROM, electrically programmable ROM, electrically erasable programmable ROM, register, hard disk, removable disk, CD-ROM, or storage medium of any other form known in the field.

The above embodiments describe the object, the technical solution and the technical effect of the present invention in detail. It shall be appreciated that the above descriptions are just preferred embodiments of the present invention and cannot limit the protection scope of the present invention. Any modification, equivalent substitution, improvement, etc., without departing from the spirit and rule of the present invention, shall be covered by the protection scope of the present invention.

What is claimed is:

1. A mainframe-based far-distance bicentric processing method for transaction, wherein the method is carried out by a system which comprises a main processing center and a backup processing center, characterized in including following steps:
   Receiving, by the main processing center, upload transaction containing transaction type data;
   searching, by the main processing center, transaction requiring an amount of shared resource less than a preset threshold when being processed, according to the transaction type data;
   transmitting, by the main processing center, the transaction requiring the amount of shared resource less than the preset threshold when being processed, to the backup processing center to be processed, when a CPU of the main processing center utilization rate exceeds a preset safety threshold.

2. The method according to claim 1, characterized in that, the method further comprises a step of establishing a System Network Architecture (SNA) connection with the main processing center by a peripheral gateway and uploading transaction to the main processing center through the SNA connection.

3. The method according to claim 1, characterized in that, the method further comprises a step of uploading, by a peripheral gateway, transaction to the main processing center through a Transmission Control Protocol/Internet Protocol Sysplex Distributor (TCP/IP SD) port of the main processing center.

4. The method according to claim 1, characterized in that, the method further comprises a step of classifying, by the main processing center, transaction according to an amount of shared resource required when the transaction being processed, and sorting out transaction requiring a small amount of shared resource when being processed;
   the step of searching, by the main processing center, transaction requiring an amount of shared resource less than a preset threshold when being processed according to the transaction type data comprises: searching, by the main processing center, transaction of a classification which requires an amount of shared resource less than a preset threshold when being processed, according to the transaction type data.

5. The method according to claim 1, characterized in that, after the step of searching, by the main processing center, the transaction requiring the amount of shared resource less than the preset threshold when being processed, the method further comprises a step of generating, by the main processing center, an automatic routing switching script for the transaction requiring the amount of shared resource less than the preset threshold when being processed;
   the step of transmitting, by the main processing center, the transaction requiring the amount of shared resource less than the preset threshold when being processed to the backup processing center to be processed comprises: routing, by the main processing center, the transaction requiring the amount of shared resource less than the preset threshold when being processed, to the backup processing center to be processed in batches and in series, according to the automatic routing switching script.

6. The method according to claim 5, characterized in that, the step of routing, by the main processing center, the transaction to the backup processing center to be processed comprises: performing, by the main processing center, a routing control according to transaction routing rules of CICSPlex System Manager Workload definitions (CPSM WLMdef), and routing the transaction to the backup processing center to be processed.

7. The method according to claim 5, characterized in that, the step of routing, by the main processing center, the transaction to the backup processing center to be processed comprises: routing, by the main processing center, the transaction to the backup processing center to be processed by dynamically activating TCP/IP SD policy according to classification of a service port.

8. The method according to claim 1, characterized in that, the shared resource is application database lock, and the transaction requiring the amount of shared resource less than the preset threshold when being processed is read-only transaction and lightweight update transaction.

9. A mainframe-based far-distance bicentric processing system for transaction, characterized in including:
   a receiving unit for receiving upload transaction containing transaction type data;
   a searching unit for searching transaction requiring an amount of shared resource less than a preset threshold when being processed, according to the transaction type data;
   a transmitting unit for transmitting the transaction requiring the amount of shared resource less than the preset threshold when being processed to a backup processing center to be processed, when a CPU utilization rate exceeds a preset safety threshold.

10. A mainframe-based far-distance bicentric processing system for transaction, characterized in including a main processing center and a backup processing center;
   the main processing center including:
   a TCP/IP SD port and a main Terminal Owing Region (TOR) for forwarding received upload transaction based on a preset routing rule, according to transaction type data contained in the received transaction; and
   a main Application Owing Region (AOR) for processing the upload transaction forwarded by the TCP/IP SD port and the main TOR;
   the backup processing center including:
   a backup AOR for receiving and processing transaction forwarded by the TCP/IP SD port or the main TOR which requires an amount of shared resource less than a preset threshold when being processed, when a CPU utilization rate of the main processing center exceeds a preset safety threshold.

11. The system according to claim 10, characterized in that the main processing center further comprises a main encryption region.

12. The system according to claim 10, characterized in that the backup processing center further comprises a backup encryption region.

* * * * *